(12) United States Patent
Kracke

(10) Patent No.: US 10,501,167 B2
(45) Date of Patent: Dec. 10, 2019

(54) FOLDING WING

(71) Applicant: Goodrich Actuation Systems Limited, Solihull, West Midlands (GB)

(72) Inventor: Jeremy Kracke, Stone (GB)

(73) Assignee: GOODRICH ACTUATION SYSTEMS LIMITED, Solihull, West Midlands (GB)

(*) Notice: Subject to any disclaimer, the term of this patent is extended or adjusted under 35 U.S.C. 154(b) by 345 days.

(21) Appl. No.: 15/636,083

(22) Filed: Jun. 28, 2017

(65) Prior Publication Data

US 2018/0001992 A1    Jan. 4, 2018

(30) Foreign Application Priority Data

Jun. 29, 2016  (EP) .................................... 16275094

(51) Int. Cl.
*B64C 3/56*    (2006.01)

(52) U.S. Cl.
CPC ...................................... *B64C 3/56* (2013.01)

(58) Field of Classification Search
CPC .... B64C 3/38; B64C 3/56; B64C 3/10; B64C 45/00
See application file for complete search history.

(56) References Cited

U.S. PATENT DOCUMENTS

| 2,289,224 | A |   | 7/1942  | Swanson et al. |            |
|-----------|---|---|---------|----------------|------------|
| 2,418,301 | A | * | 4/1947  | Heal           | B64C 3/42  |
|           |   |   |         |                | 244/91     |
| 2,468,425 | A | * | 4/1949  | Carpenter      | B64C 3/56  |
|           |   |   |         |                | 74/520     |
| 3,275,265 | A | * | 9/1966  | Alvarez-Calderon | ........  |
|           |   |   |         |                | B64C 23/005 |
|           |   |   |         |                | 244/207    |
| 4,776,542 | A | * | 10/1988 | Van Dam        | B64C 3/10  |
|           |   |   |         |                | 244/198    |
| 5,039,032 | A | * | 8/1991  | Rudolph        | B64C 3/10  |
|           |   |   |         |                | 244/35 R   |
| 5,201,479 | A | * | 4/1993  | Renzelmann     | B64C 3/56  |
|           |   |   |         |                | 244/49     |
| 5,348,253 | A | * | 9/1994  | Gratzer        | B64C 23/069 |
|           |   |   |         |                | 244/91     |
| 5,350,135 | A | * | 9/1994  | Renzelmann     | B64C 3/56  |
|           |   |   |         |                | 244/49     |

(Continued)

FOREIGN PATENT DOCUMENTS

GB            635259 A      4/1950

OTHER PUBLICATIONS

European Search Report for application EP 16275094.7, dated Dec. 16, 2016, 5 pgs.

*Primary Examiner* — Justin M Benedik
(74) *Attorney, Agent, or Firm* — Cantor Colburn LLP

(57) ABSTRACT

A folding wing for an aircraft comprises a main wing portion having an upper surface and a lower surface and a wing tip portion having an upper surface and a lower surface and movable relative to the main wing portion about a folding axis. The wing further comprises a linkage mechanism connecting the wing tip portion to the main wing portion and an actuator coupled to the linkage system. Movement of the actuator causes the wing tip portion to move from a first position in which the wing tip portion extends in substantially the same plane as the main wing portion to a second position in which the wing tip portion is angled relative to the main wing portion.

16 Claims, 8 Drawing Sheets

(56) References Cited

U.S. PATENT DOCUMENTS

| | | | | |
|---|---|---|---|---|
| 5,381,986 | A * | 1/1995 | Smith | B64C 3/56 |
| | | | | 244/49 |
| 6,260,799 | B1 * | 7/2001 | Russ | B64C 3/56 |
| | | | | 244/49 |
| 9,045,217 | B2 | 6/2015 | Kordel et al. | |
| 9,139,285 | B2 | 9/2015 | Schlipf et al. | |
| 2005/0133672 | A1 * | 6/2005 | Irving | B64C 23/072 |
| | | | | 244/201 |
| 2007/0018049 | A1 * | 1/2007 | Stuhr | B64C 23/069 |
| | | | | 244/124 |
| 2015/0298793 | A1 | 10/2015 | Fox et al. | |

* cited by examiner

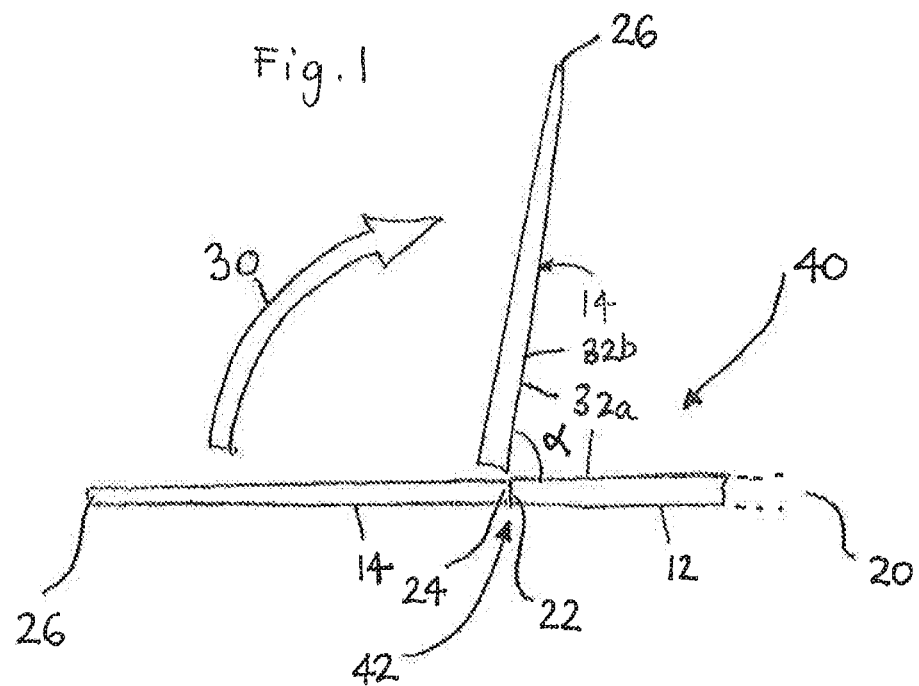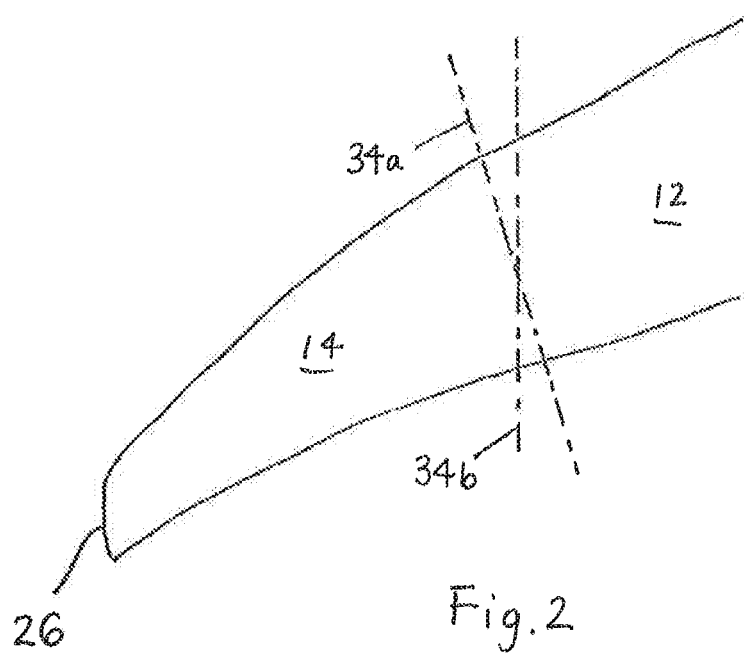

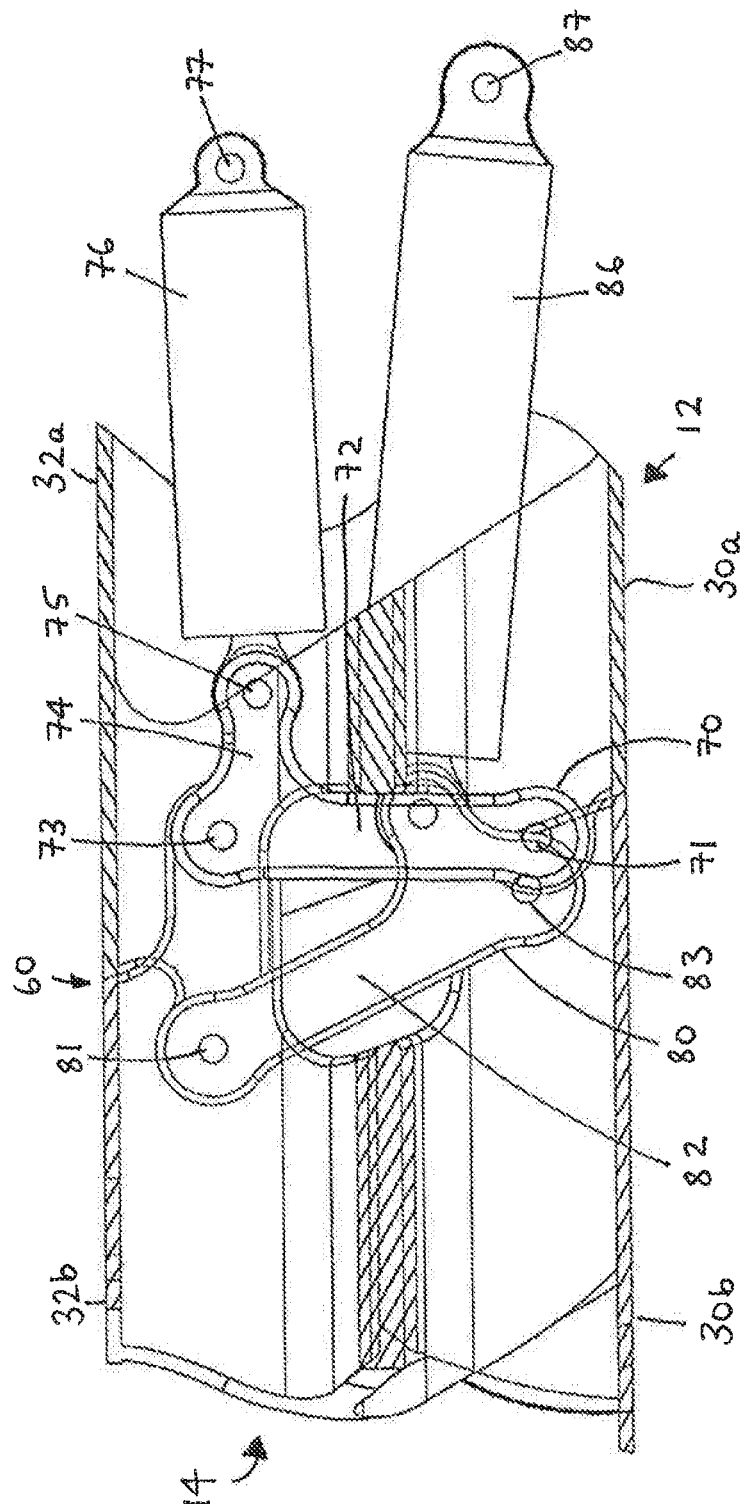

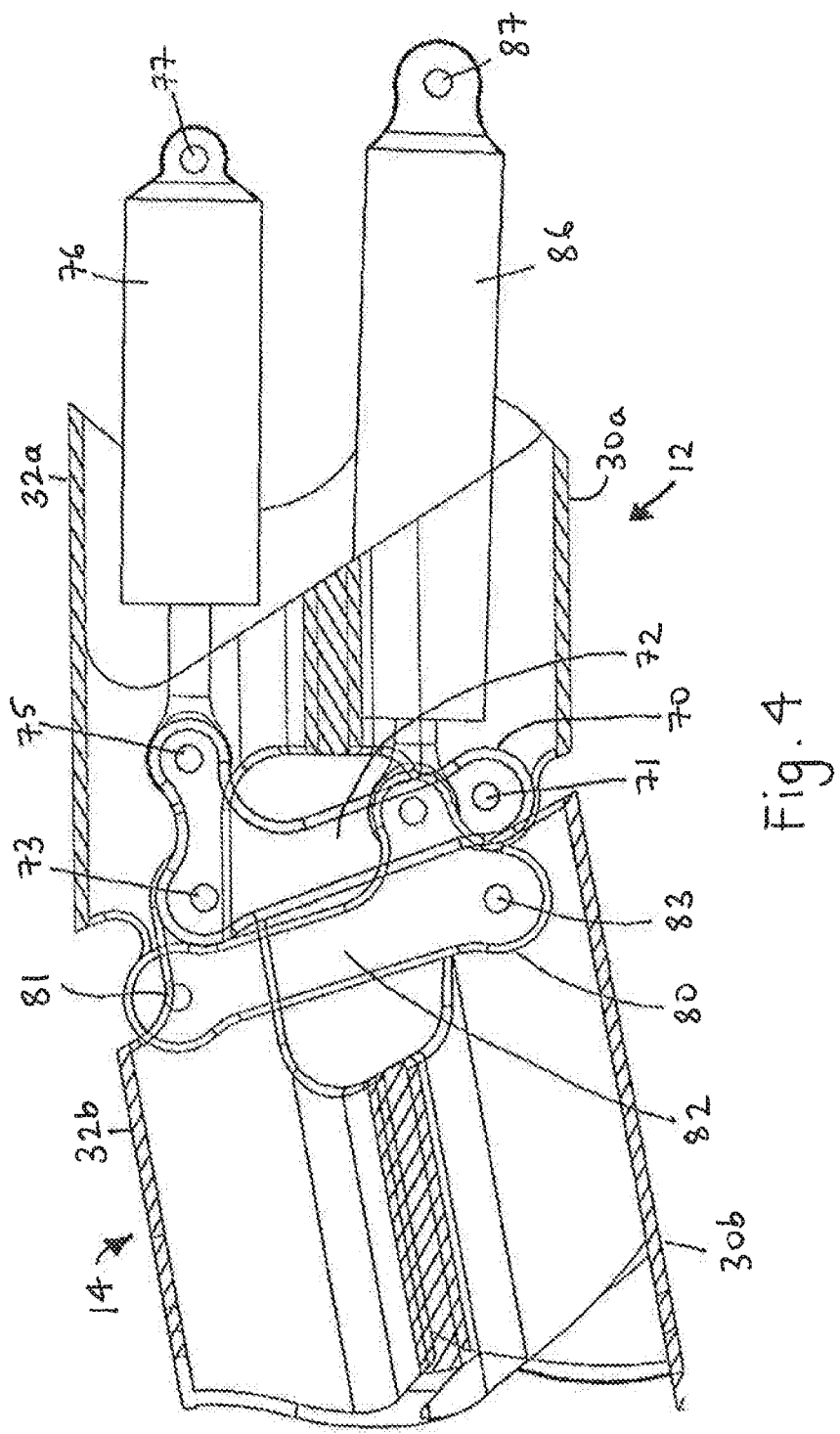

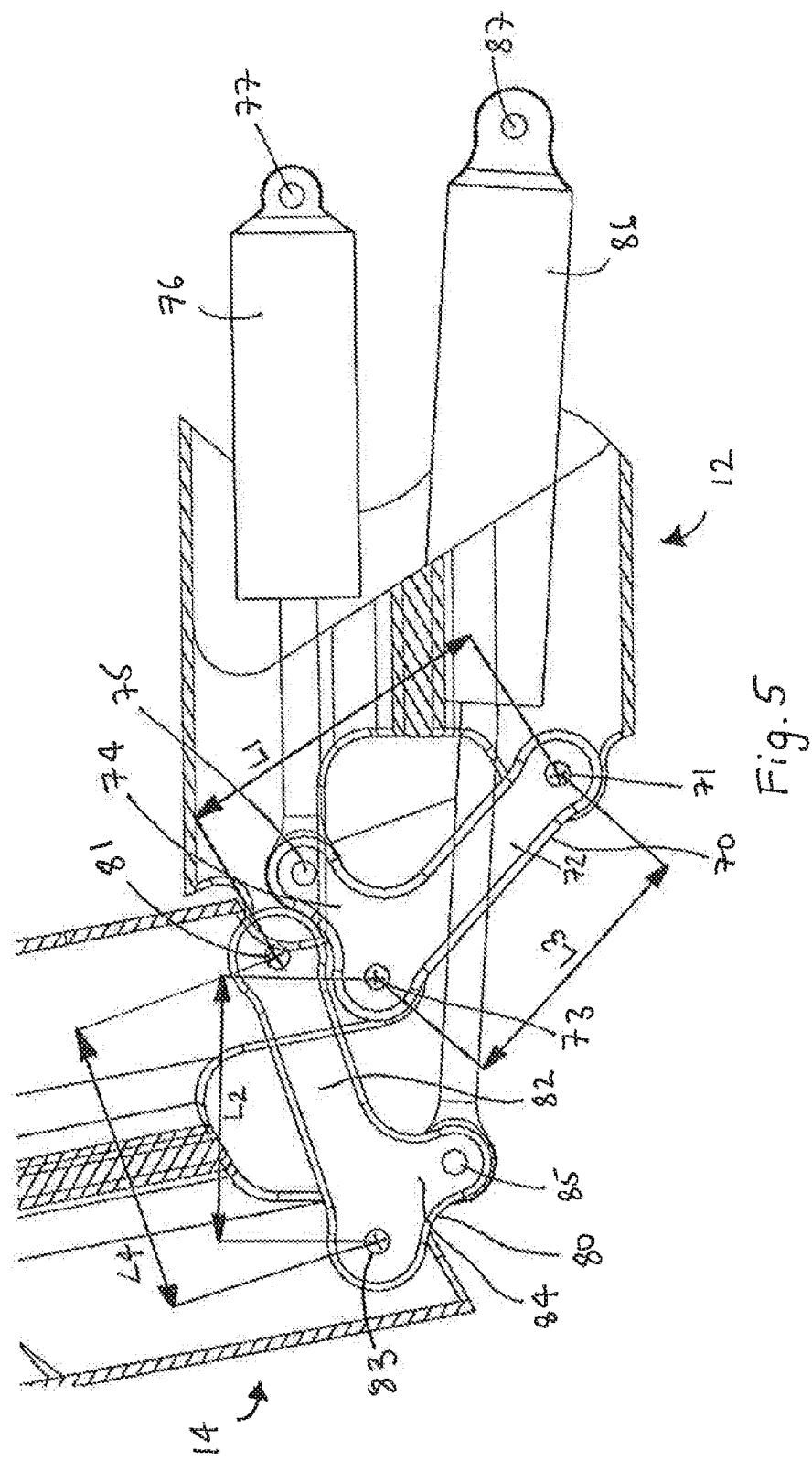

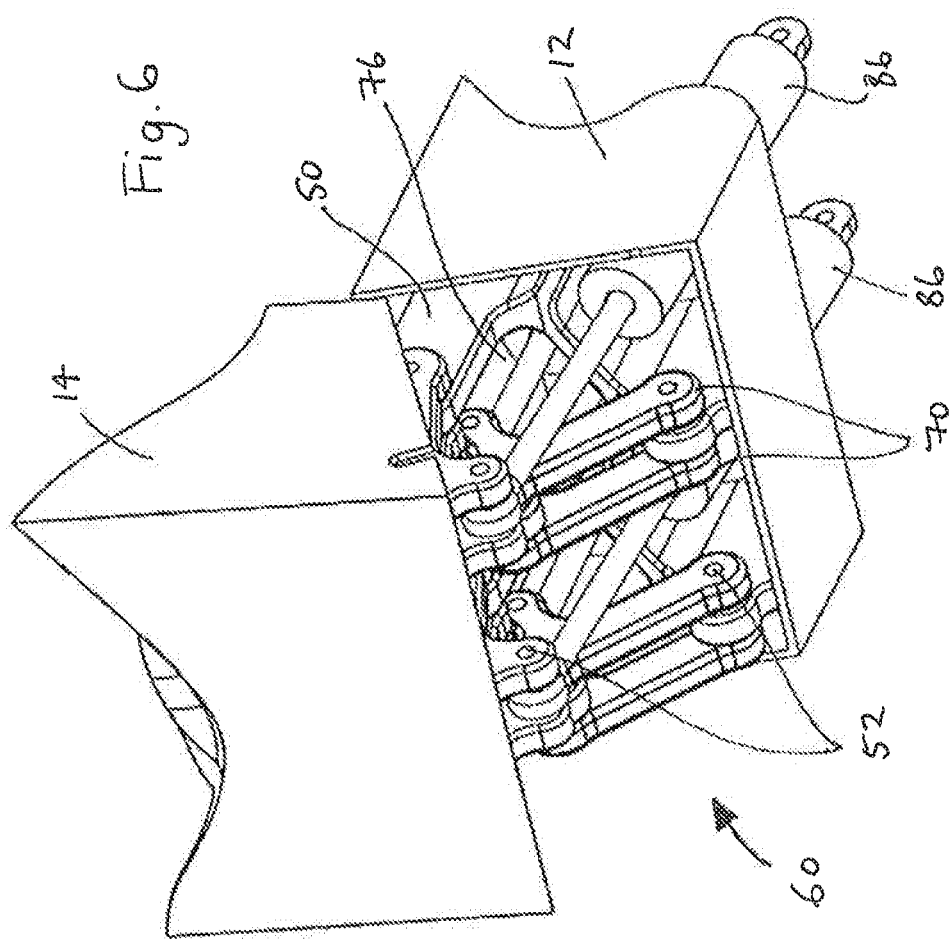

FOLDING WING

FOREIGN PRIORITY

This application claims priority to European Patent Application No. 16275094.7 filed Jun. 29, 2016, the entire contents of which is incorporated herein by reference.

TECHNICAL FIELD

The present disclosure relates to a folding wing for an aircraft.

BACKGROUND

The fuel efficiency of an aircraft during flight may be improved by increasing the wing span of the aircraft. This increases the aspect ratio of the wing, leading to an improved lift/drag ratio. However large wing spans are undesirable for on-ground maneuvers and logistics. For example, commercial aircraft having large wing spans require larger gates at airport which can be costly to airlines.

This problem may be addressed by providing a folding wing tip on an aircraft wing. This will allow a larger wing span during flight and reduced wing span after landing. However, known wing tip folding mechanisms provide undesirable interference with the surfaces of the wing and/or require complex and heavy lock mechanisms to keep the wing tips in an extended position during flight. These factors reduce the benefits of the increased wing span.

SUMMARY

From a first aspect, this disclosure provides a folding wing for an aircraft. The wing comprises a main wing portion having an upper surface and a lower surface and a wing tip portion having an upper surface and a lower surface and movable relative to the main wing portion about a folding axis. The wing further comprises a linkage mechanism connecting the wing tip portion to the main wing portion and an actuator coupled to the linkage system. Movement of the actuator causes the wing tip portion to move from a first position in which the wing tip portion extends in substantially the same plane as the main wing portion to a second position in which the wing tip portion is angled relative to the main wing portion. The linkage mechanism is configured such that movement of the wing tip portion from the first position to the second position includes an initial phase of movement wherein the wing tip portion moves downwardly and away from the main wing portion and a further phase of movement wherein the wing tip portion moves rotates upwardly into the second position.

The linkage system may comprise a first link and a second link. The first link may be pivotally attached to the wing tip portion via an upper joint adjacent the upper surface thereof and pivotally attached to the main wing portion via a lower joint adjacent the lower surface thereof. The second link may be pivotally attached to the wing tip portion via a lower joint adjacent the lower surface thereof and pivotally attached to the main wing portion via an upper joint adjacent the upper surface thereof and wherein the actuator is coupled to at least one of the first or second links.

The wing may comprise a first actuator coupled to the first link and a second actuator coupled to the second link.

The first and second links may be attached to the main wing portion and wing tip portion via revolute joints. The axes of the revolute joints of the second link may be horizontally offset from one another in the spanwise direction of the wing.

The length between the joints of the second link may be longer than the length between the joints of first link.

The main wing portion, wing tip portion, first link and second link may form a four bar linkage.

The first and second links may be configured to cross over during movement of the wing tip portion.

During the initial phase of movement the first link may be configured to pivot about its lower joint by a first angle and the second link may be configured to pivot about its upper joint by a second angle. The first angle may be greater than the second angle.

The first and second links may be generally L-shaped, for example having a first arm and a second arm arranged generally perpendicular to the first arm adjacent an end thereof. The actuator may be attached to the at least one link via the second arm of the link.

The linkage system may comprise a link pivotally attached to the wing tip portion via an upper joint adjacent the upper surface thereof and pivotally attached to the main wing portion via a lower joint adjacent the lower surface thereof. The wing may further comprise a first actuator and a second actuator wherein the first actuator is coupled to the first link and the second actuator is coupled to the wing tip portion at a revolute joint adjacent the lower surface of the wing tip portion.

The linkage system may comprise a link pivotally attached to the wing tip portion via a lower joint adjacent the lower surface thereof and pivotally attached to the main wing portion via an upper joint adjacent the upper surface thereof and wherein the wing comprises a first actuator and a second actuator wherein the first actuator is coupled to the wing tip portion and the second actuator is coupled to the link at a revolute joint adjacent the upper surface of the wing tip portion.

The linkage system may include an upper revolute joint adjacent an upper surface of the wing tip portion and a lower revolute joint adjacent the lower surface (30b) of the wing tip portion such that during the initial phase of movement the wing tip portion is configured to pivot about the lower revolute joint by a first angle $\theta 1$ and about the upper revolute joint by a second angle $\theta 2$. $\theta 1$ may be greater than $\theta 2$.

During the further phase of movement the wing tip portion may be configured to pivot about the lower revolute joint by a third angle $\theta 3$ and about the upper revolute joint by a fourth angle $\theta 4$. $\theta 4$ may be greater than $\theta 3$.

The links may be arranged in pairs of links and an actuator may be positioned between the links of each pair of links and attached thereto via a clevis joint.

The main wing portion and wing tip portion may comprise opposed housings and the joints of the linkage system may be arranged within the housings.

The folding axis between the main wing portion and the wing tip portion may be substantially straight and in a chordwise or streamwise direction of the wing The disclosure also extends to an aircraft comprising any of the above folding wings.

BRIEF DESCRIPTION OF DRAWINGS

Some embodiments of the disclosure will now be described by way of example only and with reference to the accompanying drawings in which:

FIG. 1 shows a side view of a folding wing according to the disclosure;

FIG. 2 shows a plan view of a folding wing according to the disclosure;

FIG. 3 shows a detail view of a linkage system of the wing in a flight position;

FIG. 4 shows a detail view of the linkage system of the wing in an intermediate position;

FIG. 5 shows a detail view of the linkage system of the wing in a ground position;

FIG. 6 shows a perspective view of the linkage system of FIG. 4;

DETAILED DESCRIPTION

Figure 7:
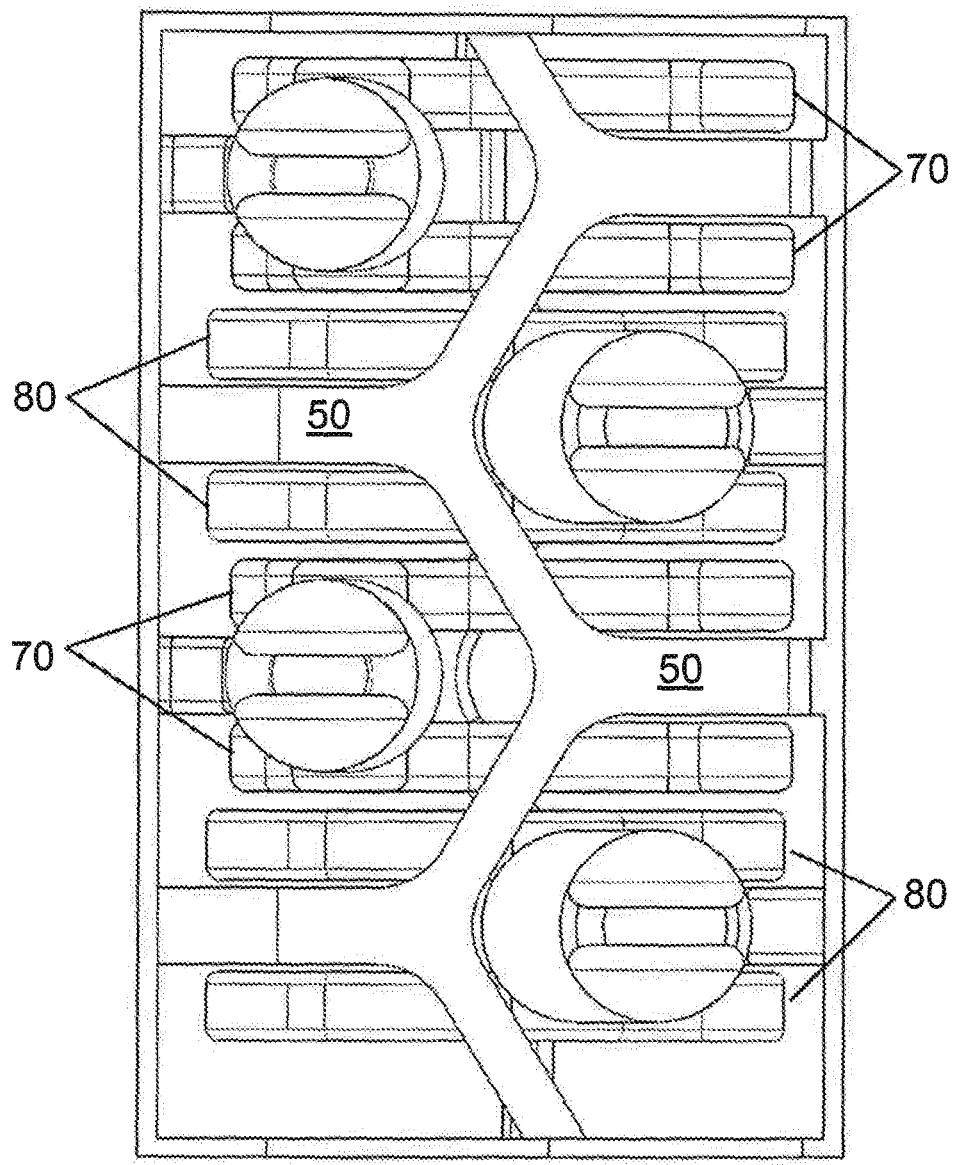
FIG. 7 shows a plan view of the linkage mechanism according to the disclosure.

With reference to FIG. 1, an exemplary folding wing 10 is illustrated. The folding wing 10 may be attached to a fixed-wing aircraft (not shown), for example a commercial, passenger aeroplane.

The folding wing 10 includes an upper surface 40 and a lower surface 42, a main wing portion 12, a wing tip portion 14. The main wing portion 12 has an inner end 20 for attachment to an aircraft, for example for attachment to the fuselage of an aircraft, and an outer end 22 which is attached to the inner end 24 of the wing tip portion 14 as described below.

The wing tip portion 14 is movable relative to the main wing portion 12 to adjust the span S of the folding wing 10. For example, the wing tip portion 14 is moveable between a first position (shown in solid lines in FIG. 1) and a second position (shown in phantom). The first position corresponds to a flight position whereby the span S of the wing 10 is maximised to provide optimum fuel efficiency during flight. The second position corresponds to a ground position whereby the span S of the wing 10 is reduced to facilitate on-ground maneuvers and logistics.

When in the first position, the wing tip portion 14 extends in substantially the same plane as the main wing portion 12 such that an upper surface 32a of the wing tip portion 14 extends from an upper surface 32b of the main wing portion 12, substantially parallel thereto. When the wing tip portion 14 is in the first position, the span S of the folding wing 10 is substantially equal to the length of both the main wing portion 12 and the wing tip portion 14 combined. In the second position, the wing tip portion 14 is positioned at an angle α relative to the main wing portion 12 such that the wing tip portion 14 extends upwardly from the outer end 22 of the main wing portion 12. When the wing tip portion 14 is in this second position, the span S of the folding wing 10 is less that the length of the main wing portion 12 and wing tip portion 14 combined.

In an embodiment, the wing tip portion 14 is substantially perpendicular to the main wing portion 12 in the second position such that the resulting span S of the wing 10 is substantially equal to the length of the main wing portion 12 only. However it will be appreciated that other positions of the wing tip portion 14 relative to the main wing portion 12 could also be used. For example, the wing tip portion 14 could have a second position wherein the angle α between wing tip portion 14 and the main wing portion 12 is less than 90°, in which case the span of the wing 10 would also be substantially equal to the length of the main wing portion 12. The wing tip portion 14 may also have a second position that is greater than 90° from the main wing portion, in this case the span of the wing will be greater than the length of the main wing portion 12 but less that the length of the main wing portion 12 and the wing tip portion 14 combined.

The main wing portion 12 and the wing tip portion 14 both comprise a hollow shell structure forming the upper and lower surfaces 40, 42 of the wing.

The wing tip portion 14 moves from the first position to the second position in the direction of the arrow 30 such that the end 26 of the wing tip portion is raised above the upper surface 32 of the main wing portion 12.

The main wing portion 12 is attached to the wing tip portion 14 via a linkage system 60 which is contained in housings formed at opposing ends of the main wing portion 12 and wing tip portion 14.

As shown in FIGS. 3-6, the linkage system 60 includes a first link 70 and a second link 80. The main wing portion 12, wing tip portion 14, first link 70 and second link 80 together form a four-bar linkage as described below.

The first link 70 is attached to the main wing portion 12 at a lower revolute joint 71 and is attached to the wing tip portion 14 at an upper revolute joint 73. The second link 80 is attached to the main wing portion 12 at an upper revolute joint 81 and is attached to the wing tip portion 14 at a lower revolute joint 83. That is, both first and second links 70, 80 are each attached to the main wing portion 12 and the wing tip portion 14.

The lower revolute joint 71 of the main wing portion 12 is positioned adjacent a lower surface 30a of the main wing portion 12. The upper revolute joint 81 of the main wing portion is 12 positioned adjacent an upper surface 32a of the main wing portion 12. That is the upper revolute joint 81 is positioned above the lower revolute joint 71 when the wing tip portion 14 is in the first position such that the upper and lower revolute joints 81, 71 are vertically offset from one another.

Likewise, the lower revolute joint 83 of the wing tip portion 14 is positioned adjacent a lower surface 30b of the wing tip portion 14. The upper revolute joint 73 of the wing tip portion 14 is positioned adjacent an upper surface 32b of the wing tip portion 12. That is the upper revolute joint 73 of the wing tip portion 14 is positioned above the lower revolute joint 83 of the wing tip portion 14 such that the upper and lower revolute joints 73, 83 are vertically offset from one another.

The main wing portion 12, wing tip portion 14, first link 70 and second link 80 together form a four-bar linkage. In the embodiment, all the components of the linkage are connected at pivot points allowing a single degree of freedom which is rotation about a pivot axis. The main wing portion 12 forms a fixed link defined between the upper and lower revolute joints 71, 81 and has a length L1. Upper and lower revolute joints 71, 81 are contained within the hollow shell of the main wing portion 12 and are horizontally offset from one another.

The link formed by the wing tip portion 14 is defined between the upper and lower revolute joints 73, 83 thereof and has a length L2. Upper and lower revolute joints 73, 83 are contained within the hollow shell structure of the wing tip portion 14 when the folding wing 10 is in the first position and are also horizontally offset from one another in this position.

The first link 70 has a length L3 defined between the upper and lower revolute joints 71, 73. The second link has a length L4 defined between the upper and lower revolute joints 81, 83.

In the embodiment the length L1 is greater than the length L2. The length L1 may be between 1 and 1.5 times the length of L2 or between 1.2 and 1.4 times the length of L2. In the embodiment, the length L1 is 1.3 times the length L2, although it will be appreciated that other ratios of L1 to L2 could be used depending on the geometry and desired motion of the folding wing.

In the embodiment the length L4 is greater than the length L3. The length L4 may be between 1 and 1.5 times the length of L3 or between 1 and 1.2 times the length of L3. In the embodiment, the length L4 is 1.1 times the length L3, although it will be appreciated that other ratios of L4 to L3 could be used depending on the geometry and desired motion of the folding wing.

In the embodiment, the linkage mechanism includes a plurality (in this embodiment two pairs) of first links 70 and a plurality of second links 80.

The plurality of first links 70 is arranged such that the joints of each first link 70 are aligned along a direction of the folding wing 10 to define a hinge line 34*a* of the wing 10. Likewise the plurality of second links is also arranged such that the joints of each second link 80 are aligned with the hinge line 34*a*.

As shown in FIG. 2, the hinge line may extend in a chordwise direction 34*a* or alternatively the hinge line may extend in a streamwise direction 34*b*.

As shown in FIG. 7 the plurality of first and second links 70, 80 are arranged in pairs and nested together such that a pair of first links 70 are positioned adjacent a pair of second links 80 such that the pair of first links 70 horizontally overlap with the pair of second links 80. A series of pairs of first links 70 and second links 80 may be arranged along the chordwise hinge line as shown. It will be appreciated that other arrangement of links and hinge lines could be used. For example, the hinge line may be curved or may be disposed at another angle relative to the chord of the wing 10.

In the embodiment, the first and second links are L-shaped links. In particular, the first link 70 has a first arm 72 and a second arm 74 arranged generally perpendicular to the first arm 72 adjacent an end thereof. Likewise, the second link 80 has a first arm 82 and a second arm 84 extending substantially perpendicular from the first arm 82 adjacent an end thereof. In the embodiment, the second arm 74 of the first link 70 extends substantially perpendicularly from the first arm 71 adjacent the upper revolute joint 73 and the second arm 84 of the second joint 80 extends generally perpendicularly from the first arm 82 adjacent the lower revolute joint 83. It will be appreciated that other configurations of link might be used for example, the first and second links may be simple bar links without a second arm; alternatively the second arms 74, 84 may extend at a different angle from the first arms 72, 82 and/or from another point along the length of the first arms 72, 82.

As shown in FIGS. 3-5, a first actuator 76 is attached to the first link 70 at a revolute joint 75 such that movement of the actuator causes the first link 70 to pivot about the lower revolute joint 71. In the embodiment, the first actuator 76 is attached to the first link 70 via the second arm 74, although it will be appreciated that the first actuator 76 could be attached to the first link 70 at any number of other positions. In this embodiment, there are two first actuators 76, each attached between a pair of first links 70.

A second actuator 86 is attached to the second link 80 at a revolute joint 85 such that movement of the actuator 86 causes the second link 70 to pivot about the upper revolute joint 81. In the embodiment, the second actuator 86 is attached to the second link 80 via the second arm 84, although it will be appreciated that the second actuator 86 could be attached to the second link 70 at any number of other positions. In this embodiment, there are two second actuators 86, each attached between a pair of second links 80.

In the embodiment, actuators 76, 86 are hydraulic linear actuators however it will be appreciated that actuators 76 and 86 may be any linear actuator such as mechanical, hydraulic, pneumatic or electrical actuators as known in the art.

Although the described embodiment includes actuators 76, 86 attached to both the first and second link 70, 80 in order to distribute load on the system primarily through the actuators 76, 86, it will be appreciated that only the first link 70 or only the second link 80 may be connected to an actuator 76, 86 in any manner as described above. However, it may be advantageous to provide actuators 76, 86 connected to both links 70, 80 to distribute the load in the system.

In the embodiment the links 70, 80 are attached to the wing portions 12, 14 at rotary joints via a clevis joint. In particular each pair of first and second links 70, 80 are attached to a part of the main wing portion 12 or the wing tip portion 14 at a clevis joint. As shown in FIGS. 6 and 7, for example, the main wing portion 12 includes a plurality of struts 50 for supporting a clevis joint. A strut 50 is arranged in between the links of each pair of links 70, 80 and a pin 52 is positioned through the pair of links 70, 80 and strut 50 to form a clevis joint. However it will be appreciated that other joints that allow rotary motion between the wing portions 12, 14 and links 70, 80 might also be used.

Likewise, the links 70, 80 are attached to the actuators 76, 86 via clevis joints such that part of the actuator 76, 86 is arranged in between the links of each pair of links 70, 80 and a pin 52 is positioned through the pair of links 70, 80 and actuator 50 to form a clevis joint. Again, it will be appreciated that other joints that allow rotary motion between the actuators 76, 86 and links 70, 80 might also be used.

As a result of the configuration described above, engagement of the actuators 76, 86 with the links 70, 80 causes movement of the wing tip portion 14 relative to the main wing portion 12 in two phases.

In an initial phase of movement, the wing tip portion 14 moves from the first position, as shown in FIG. 3, into an intermediate position, as shown in FIG. 4. In this initial phase, the first link 70 pivots about joint 71 by a first angle θ1 and the second link 80 pivots about the upper joint 81 by a second angle θ2. In the initial phase θ1 is greater than θ2. This degree of relative movement causes the wing tip portion 14 to move down and away from the main wing portion 12. The wing tip portion 14 is therefore able to rotate counter-clockwise (in the sense of the Figures) without interfering with the main wing portion 12. Thus as illustrated in FIG. 4, when in an intermediate position, at least a portion of the wing tip portion 14 is positioned below the main wing portion 12 in a direction toward the lower surface 30*a* of the main wing portion 12 and away from the main wing portion 12.

In a subsequent phase of movement, the wing tip portion 14 rotates in a direction towards the upper surface 32 of the wing 10 to its second position. In the final phase θ2 is much greater than θ1 and θ1 may remain substantially the same. During this movement, the first and second links 70, 80 cross.

Figure 8A:
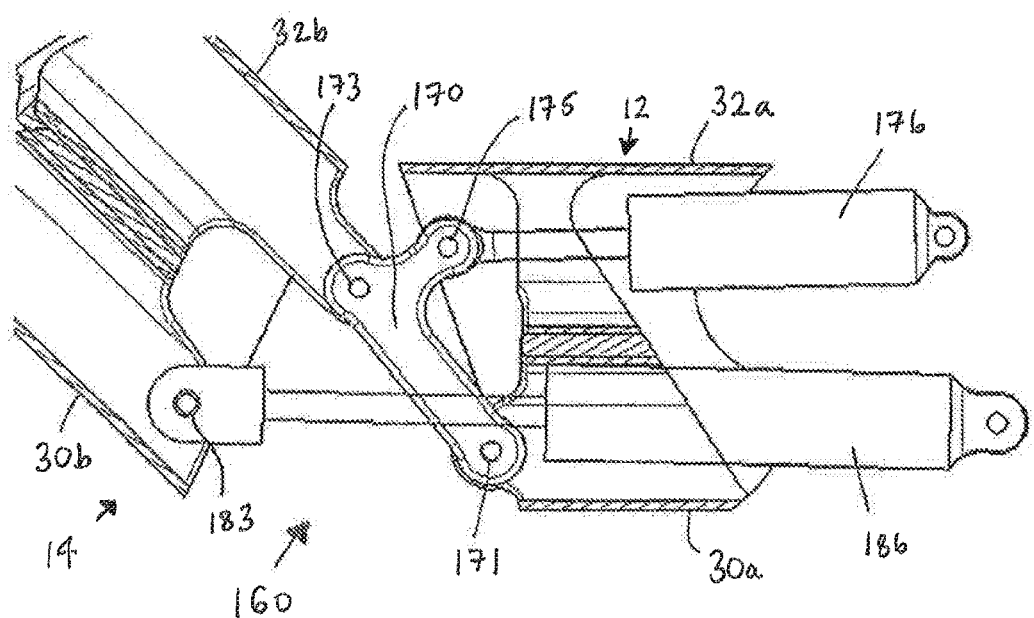
FIG. 8A shows a detail view of an alternative linkage system of the wing in a ground position.
Figure 8B:
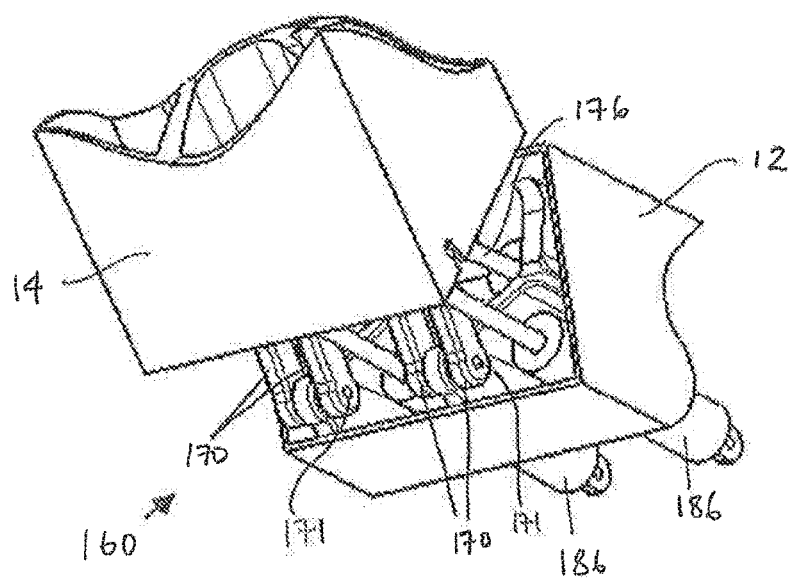
FIG. 8B shows a perspective view of the linkage system of FIG. 8A.

An alternative linkage system 160 for the wing 10 is shown in FIGS. 8A and 8B. The linkage system 160 is substantially the same as the linkage system 60 described above in relation to FIGS. 3 to 7 except that the second link is omitted and the second actuator is connected directly to the wing tip portion 14.

The linkage system 160 includes a link 170 which is attached to main wing portion and wing tip portion 14 in much the same way as the first link 70 described above. That is, the link 170 is attached to the main wing portion 12 at a lower revolute joint 171 and is attached to the wing tip portion 14 at an upper revolute joint 173. The lower revolute joint 171 of the main wing portion 12 is positioned adjacent a lower surface 30a of the main wing portion 12. The upper revolute joint 173 of the wing tip portion 14 is positioned adjacent an upper surface 32b of the wing tip portion 12.

The linkage system 160 includes a plurality of links 170 arranged in pairs as shown in FIG. 8B. In this embodiment, the linkage system 160 includes two pairs of links 170 however more pairs or fewer pairs may be used to suit the loading thereon. It will be appreciated that other arrangements of multiple links 170 may also be used.

The plurality of links 170 is arranged such that the joints of each link 170 are aligned along a direction of the folding wing 10 to define a hinge line 34a of the wing 10.

The links 170 may be L-shaped links as described above. An actuator 176 is attached to the link 170 at a revolute joint 175 such that movement of the actuator 176 causes the link 170 to pivot about the lower revolute joint 171. In this embodiment, the actuator 176 is attached to the link 170 via the arm 174, although it will be appreciated that the actuator 176 could be attached to the first link 170 at any number of other positions. In this embodiment, there are two actuators 176, each attached between a pair of links 170.

A second actuator 186 is attached directly to the wing tip portion 14 via a lower revolute joint 183 which is positioned adjacent the lower surface 30b of the wing tip portion 14. Movement of the second actuator 186 causes the wing tip portion 14 to pivot about the upper revolute joint 173 between the link 170 and wing tip portion 14.

The first and second actuators 176, 186 may be hydraulic linear actuators or any other actuator as described with reference to the embodiment above. In this embodiment, the position of one or both of the actuators 176, 186 may be controlled using a servomechanism, i.e. servo control.

The links 170 are attached to the wing portions 12, 14 and the actuator 176 via clevis joints as described in relation to the embodiment above, although it will be appreciated that other attachment configurations may be used.

In a similar manner to the previous embodiment, engagement of the actuators 176, 186 with the link 170 and wing tip portion 14 causes movement of the wing tip portion 14 relative to the main wing portion 12 in two phases.

In an initial phase of movement, the wing tip portion 14 moves from the first position into an intermediate position. In this initial phase, the link 170 pivots about joint 171 by a first angle θ1 and the wing tip portion 14 pivots about the upper joint 173 by a second angle θ2. In the initial phase θ1 is greater than θ2. This degree of relative movement causes the wing tip portion 14 to move down and away from the main wing portion 12. The wing tip portion 14 is therefore able to rotate counter-clockwise (in the sense of the Figures) without interfering with the main wing portion 12. Thus, when in an intermediate position, at least a portion of the wing tip portion 14 is positioned below the main wing portion 12 in a direction toward the lower surface 30a of the main wing portion 12 and away from the main wing portion 12.

In a subsequent phase of movement, the wing tip portion 14 rotates in a direction towards the upper surface 32 of the wing 10 to its second position. In the final phase θ2 is much greater than θ1 and θ1 may remain substantially the same.

Figure 9A:
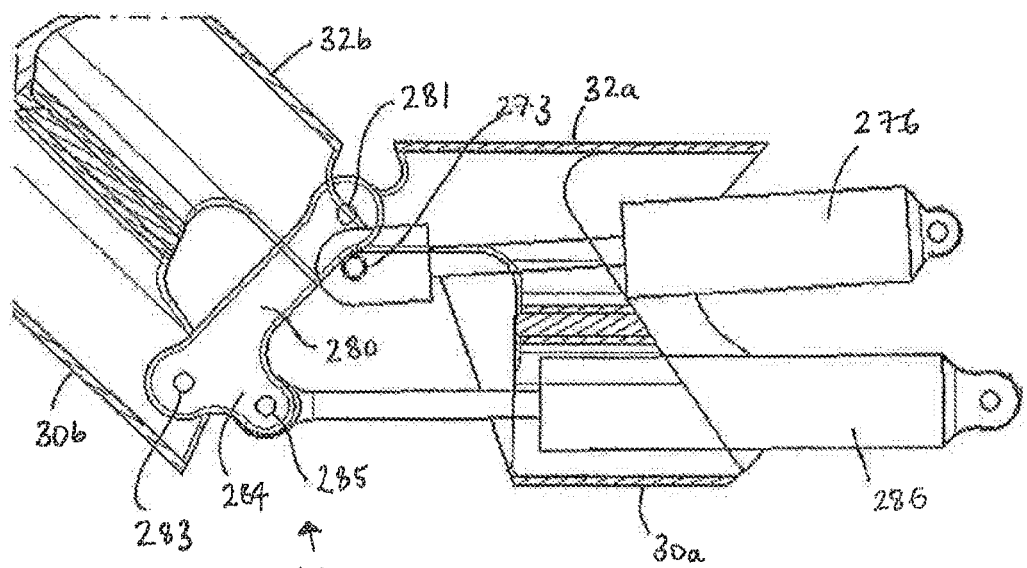
FIG. 9A shows a detail view of another alternative linkage system of the wing in a ground position.
Figure 9B:
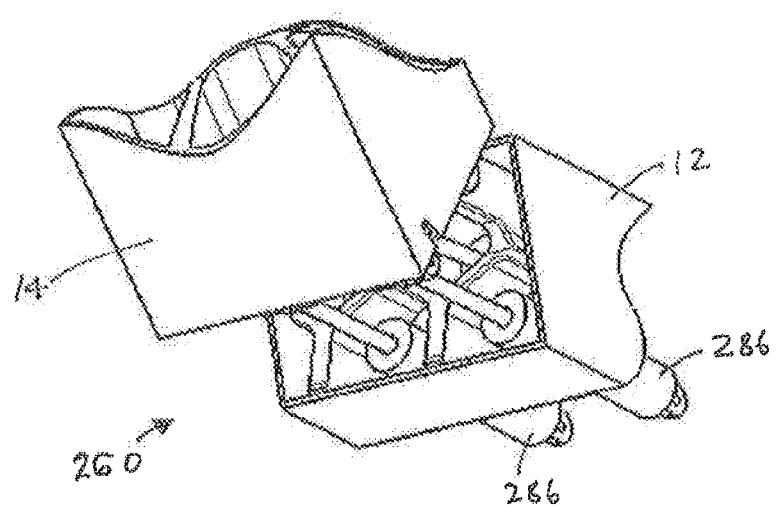
FIG. 9B shows a perspective view of the linkage system of FIG. 9A.

Another linkage system 260 for the wing 10 is shown in FIGS. 9A and 9B. The linkage system 260 is substantially the same as the linkage system 60 described above in relation to FIGS. 3 to 7 except that the first link is omitted and the first actuator is connected directly to the wing tip portion 14.

The linkage system 260 includes a link 280 which is attached to main wing portion 12 and wing tip portion 14 in much the same way as the second link 80 described above. That is, the link 280 is attached to the main wing portion 12 at an upper revolute joint 281 and is attached to the wing tip portion 14 at a lower revolute joint 283. The upper revolute joint 281 of the main wing portion is 12 positioned adjacent an upper surface 32a of the main wing portion 12 and the lower revolute joint 283 of the wing tip portion 14 is positioned adjacent a lower surface 30b of the wing tip portion 14.

The linkage system 260 includes a plurality of links 280 arranged in pairs as shown in FIG. 89B. In this embodiment, the linkage system 260 includes two pairs of links 280 however more pairs or fewer pairs may be used to suit the loading thereon. It will be appreciated that other arrangements of multiple links 280 may also be used.

The plurality of links 280 is arranged such that the joints of each link 280 are aligned along a direction of the folding wing 10 to define a hinge line 34a of the wing 10.

The links 280 may be L-shaped links as described above. An actuator 286 is attached to the link 280 at a revolute joint 285 such that movement of the actuator causes the link 280 to pivot about the upper revolute joint 81. In the embodiment, the actuator 286 is attached to the link 280 via the second arm 284, although it will be appreciated that the actuator 286 could be attached to the link 280 at any number of other positions. In this embodiment, there are two actuators 286, each attached between a pair of links 280.

A further actuator 276 is attached directly to the wing tip portion 14 via an upper revolute joint 273 which is positioned adjacent the upper surface 32b of the wing tip portion 14. Movement of the further actuator 276 causes the wing tip portion 14 to pivot about the lower revolute joint 283 between the link 280 and wing tip portion 14.

The first and second actuators 276, 286 may be hydraulic linear actuators or any other actuator as described with reference to the embodiments above. In this embodiment, the position of one or both of the actuators 276, 286 may be controlled using a servomechanism, i.e. servo control.

The links 280 are attached to the wing portions 12, 14 and the actuator 286 via clevis joints as described in relation to the embodiment above, although it will be appreciated that other attachment configurations may be used.

In a similar manner to the previous embodiment, engagement of the actuators 276, 286 with the link 180 and wing tip portion 14 causes movement of the wing tip portion 14 relative to the main wing portion 12 in two phases.

In an initial phase of movement, the wing tip portion 14 moves from the first position into an intermediate position. In this initial phase, the wing tip portion 14 pivots about joint 283 by a first angle θ1 and the link 280 pivots about the upper joint 281 by a second angle θ2. In the initial phase θ1 is greater than θ2. This degree of relative movement causes the wing tip portion 14 to move down and away from the main wing portion 12. The wing tip portion 14 is therefore able to rotate counter-clockwise (in the sense of the Figures) without interfering with the main wing portion 12. Thus, when in an intermediate position, at least a portion of the wing tip portion 14 is positioned below the main wing portion 12 in a direction toward the lower surface 30a of the main wing portion 12 and away from the main wing portion 12.

In a subsequent phase of movement, the wing tip portion 14 rotates in a direction towards the upper surface 32 of the wing 10 to its second position. In the final phase θ2 is much greater than θ1 and θ1 may remain substantially the same.

By configuring the linkage mechanisms such that the wing tip portion 14 must firstly move in a downwards arc, the wing tip portion 14 will be prevented from moving towards the second position when experiencing lift forces during flight, for example. This may reduce the locking requirements of the folding mechanism such that the wing may be locked simply by locking the actuators 76, 86 or via a simple mechanical lock. The locking mechanism itself will not have to transmit large lift forces.

Furthermore, when the aircraft is on the ground where gravitational forces dominate any lift forces on the wing, deployment of the folding wing to the second position is facilitated thereby requiring less initial force to actuate the wing tip portion 14.

What is claimed is:

1. A folding wing for an aircraft comprising:
a main wing portion having an upper surface and a lower surface;
a wing tip portion having an upper surface and a lower surface and movable relative to the main wing portion about a folding axis;
a linkage mechanism connecting the wing tip portion to the main wing portion; and
at least one actuator coupled to the linkage system such that movement of the at least one actuator causes the wing tip portion to move from a first position in which the wing tip portion extends in substantially the same plane as the main wing portion to a second position in which the wing tip portion is angled relative to the main wing portion, wherein the linkage mechanism is configured such that movement of the wing tip portion from the first position to the second position includes an initial phase of movement wherein the wing tip portion moves downwardly and away from the main wing portion and a further phase of movement wherein the wing tip portion moves rotates upwardly into the second position.

2. A folding wing as claimed in claim 1, wherein the linkage system comprises a first link and a second link, wherein the first link is pivotally attached to the wing tip portion via an upper joint adjacent the upper surface thereof and pivotally attached to the main wing portion via a lower joint adjacent the lower surface thereof and the second link is pivotally attached to the wing tip portion via a lower joint adjacent the lower surface thereof and pivotally attached to the main wing portion via an upper joint adjacent the upper surface thereof and wherein the actuator is coupled to at least one of the first or second links.

3. A folding wing as claimed in claim 2, comprising a first actuator coupled to the first link and a second actuator coupled to the second link.

4. A folding wing as claimed in claim 3, wherein the first and second links are attached to the main wing portion and wing tip portion via revolute joints, wherein the axes of the revolute joints of the second link are horizontally offset from one another in the spanwise direction of the wing.

5. A folding wing as claimed in claim 2, wherein the length between the joints of the second link is longer than the length between the joints of first link.

6. A folding wing as claimed in any of claim 2, wherein the main wing portion, wing tip portion, first link and second link form a four bar linkage.

7. A folding wing as claimed in any of claim 2, wherein the first and second links are configured to cross over during movement of the wing tip portion.

8. A folding wing as claimed in any of claim 2, wherein during the initial phase of movement the first link is configured to pivot about its lower joint by a first angle θ1 and the second link is configured to pivot about its upper joint by a second angle θ2, wherein θ1 is greater than θ2.

9. A folding wing as claimed in any of claim 2, wherein the first and second links are L-shaped and wherein the actuator is attached to the at least one link via an arm of the link.

10. A folding wing as claimed in claim 1, wherein the linkage system comprises a link pivotally attached to the wing tip portion via an upper joint adjacent the upper surface thereof and pivotally attached to the main wing portion via a lower joint adjacent the lower surface thereof and wherein the wing comprises a first actuator and a second actuator wherein the first actuator is coupled to the first link and the second actuator is coupled to the wing tip portion at a revolute joint adjacent the lower surface of the wing tip portion.

11. A folding wing as claimed in claim 1, wherein the linkage system comprises a link, wherein the link is pivotally attached to the wing tip portion via a lower joint adjacent the lower surface thereof and pivotally attached to the main wing portion via an upper joint adjacent the upper surface thereof and wherein the wing comprises a first actuator and a second actuator wherein the first actuator is coupled to the wing tip portion and the second actuator is coupled to the link at a revolute joint adjacent the upper surface of the wing tip portion.

12. A folding wing as claimed in claim 1, wherein the linkage system includes an upper revolute joint adjacent an upper surface of the wing tip portion and a lower revolute joint adjacent the lower surface of the wing tip portion such that during the initial phase of movement the wing tip portion is configured to pivot about the lower revolute joint by a first angle θ1 and about the upper revolute joint by a second angle θ2, wherein θ1 is greater than θ2 and during the further phase of movement the wing tip portion is configured to pivot about the lower revolute joint by a third angle θ3 and about the upper revolute joint by a fourth angle θ4, wherein θ4 is greater than θ3.

13. A folding wing as claimed in claim 3, wherein the links are arranged in pairs of links and an actuator is positioned between the links of each pair and attached thereto via a clevis joint.

14. A folding wing as claimed in claim 1, wherein the main wing portion and wing tip portion comprise opposed housings, the linkage system being arranged within the housings.

15. A folding wing as claimed in claim 1, wherein the axis between the main wing portion and the wing tip portion is substantially straight and in a chordwise or streamwise direction of the wing.

16. An aircraft, the aircraft including:
a wing, the wing comprising:
- a main wing portion having an upper surface and a lower surface;
- a wing tip portion having an upper surface and a lower surface and movable relative to the main wing portion about a folding axis;
- a linkage mechanism connecting the wing tip portion to the main wing portion; and
- at least one actuator coupled to the linkage system such that movement of the at least one actuator causes the wing tip portion to move from a first position in which the wing tip portion extends in substantially the same plane as the main wing portion to a second position in which the wing tip portion is angled relative to the main wing portion, wherein the linkage mechanism is configured such that movement of the wing tip portion from the first position to the second position includes an initial phase of movement wherein the wing tip portion moves downwardly and away from the main wing portion and a further phase of movement wherein the wing tip portion moves rotates upwardly into the second position.

* * * * *